United States Patent
Huang et al.

(10) Patent No.: US 8,354,826 B2
(45) Date of Patent: Jan. 15, 2013

(54) INTEGRATED DEVICE WITH AC TO DC CONVERSION FUNCTION AND INTEGRATED CIRCUIT USING SAME

(75) Inventors: Chien-Teng Huang, HsinChu (TW); Shang-Ming Hung, HsinChu (TW); Jeng-Feng Lan, HsinChu (TW)

(73) Assignee: Chip Goal Electronics Corporation, ROC, Hsinchu (TW)

( * ) Notice: Subject to any disclaimer, the term of this patent is extended or adjusted under 35 U.S.C. 154(b) by 473 days.

(21) Appl. No.: 12/658,227

(22) Filed: Feb. 4, 2010

(65) Prior Publication Data

US 2010/0296323 A1    Nov. 25, 2010

(30) Foreign Application Priority Data

May 21, 2009   (TW) ................................ 98116872 A

(51) Int. Cl.
*G05F 1/10*         (2006.01)
(52) U.S. Cl. ............................ 323/222; 323/908; 363/89
(58) Field of Classification Search .................... 363/16, 363/37, 86, 88, 89, 80, 61, 143; 323/220, 323/222, 224, 299, 908; 315/225, 308, 127
See application file for complete search history.

(56) References Cited

U.S. PATENT DOCUMENTS

| | | | | |
|---|---|---|---|---|
| 5,097,402 A * | 3/1992 | Kriz et al. | | 363/61 |
| 5,654,884 A * | 8/1997 | Mohan | | 363/126 |
| 6,061,251 A * | 5/2000 | Hutchison et al. | | 361/820 |
| 6,373,733 B1 * | 4/2002 | Wu et al. | | 363/89 |
| 6,714,429 B2 * | 3/2004 | Phadke | | 363/89 |
| 8,084,327 B2 * | 12/2011 | Sapp | | 438/270 |

\* cited by examiner

*Primary Examiner* — Rajnikant Patel

(74) *Attorney, Agent, or Firm* — Tung & Associates

(57) ABSTRACT

The present invention discloses an integrated device with AC to DC conversion function, and an integrated circuit using the device. The integrated circuit comprises: a circuit operating under low DC voltage; and an integrated device with AC to DC conversion function, the device including first, second, third and fourth diodes, wherein the first diode has a cathode coupled to an anode of the second diode at a first node which receives an input of an AC voltage; the third diode has a cathode coupled to an anode of the fourth diode at a second node which receives another input of the AC voltage; the first diode has an anode coupled to an anode of the third diode at a third node which provides a low level of a DC voltage; and the second diode has a cathode coupled to a cathode of the fourth diode at a fourth node which provides a high level of the DC voltage.

14 Claims, 3 Drawing Sheets

INTEGRATED DEVICE WITH AC TO DC CONVERSION FUNCTION AND INTEGRATED CIRCUIT USING SAME

BACKGROUND OF THE INVENTION

1. Field of Invention

The present invention relates to an integrated device with AC (alternating current) to DC (direct current) conversion function, and an integrated circuit using the integrated device.

2. Description of Related Art

In an electronic circuit, it is often required to convert an AC voltage to a DC voltage and supply the latter to an integrated circuit. As shown in FIG. 1, conventionally, a bridge rectifier 10 is used for such AC to DC conversion. The bridge rectifier 10 includes resistors R1 and R2 to lower the AC voltage level, and four diodes 12, 14, 16, and 18 to rectify the AC voltage. A resistor R further reduces the rectified DC voltage, and a Zener diode Z is provided to clamp the upper limit of the DC voltage; the DC voltage is supplied to a subsequent circuit 50. The subsequent circuit 50 can be any circuit operating under low DC voltage, such as a photo sensor, an LED control circuit, etc.

Conventionally, the rectifier 10 must be formed by discrete diodes, which can not be integrated with other electronic devices to become an integrated circuit. Such disadvantage should be improved.

Accordingly, the present invention provides an integrated device with AC to DC conversion function, which can be integrated with a circuit operating under low DC voltage to become an integrated circuit. The present invention also provides an integrated circuit using the device.

SUMMARY OF THE INVENTION

A first objective of the present invention is to provide an integrated device which can be integrated with a circuit operating under low DC voltage to become an integrated circuit.

Another objective of the present invention is to provide an integrated circuit employing the integrated device with AC to DC conversion function.

To achieve the foregoing objectives, in one perspective of the present invention, it provides an integrated device with AC to DC conversion function, comprising: (1) a substrate of a first conductivity type; and (2) at least four well regions of a second conductivity type in the substrate, each well region of the second conductivity type including: (a) a heavily doped region of the first conductivity type in the well region of the second conductivity type; and (b) a heavily doped region of the second conductivity type in the well region of the second conductivity type; wherein, in each well region of the second conductivity type, a diode is formed by the heavily doped regions of the first and second conductivity type and the well region, such that four diodes are formed by four well regions, wherein the first diode has a cathode coupled to an anode of the second diode at a first node which receives an input of an AC voltage; the third diode has a cathode coupled to an anode of the fourth diode at a second node which receives another input of the AC voltage; the first diode has an anode coupled to an anode of the third diode at a third node which provides a low DC voltage level; and the second diode has a cathode coupled to a cathode of the fourth diode at a fourth node which provides a high DC voltage level; and wherein the integrated device with an AC to DC conversion function is integrated with a circuit operating under low DC voltage to become an integrated circuit.

In one preferable embodiment, each of the diodes of the integrated device with AC to DC conversion function further includes: a lightly doped region of the first conductivity type in the well region of the second conductivity type, wherein the heavily doped region of the first conductivity type is formed in this lightly doped region of the first conductivity type. In this preferable embodiment, the heavily doped regions of the second conductivity type in the second and fourth diodes are formed in the lightly doped region of the first conductivity type.

In one preferable embodiment, the first and second diodes are located in a first region of the substrate, and the third and fourth diodes are located in a second region of the substrate; the integrated device further comprises: two MOS transistors provided between the first and second regions, one MOS transistor having a gate coupled to one of the inputs of the AC voltage and the other MOS transistor having a gate coupled to the other one of the inputs of the AC voltage.

In another perspective of the present invention, it provides an integrated circuit, comprising: a circuit operating under low DC voltage; and an integrated device with AC to DC conversion function, the device including first, second, third and fourth diodes, wherein the first diode has a cathode coupled to an anode of the second diode at a first node which receives an input of an AC voltage; the third diode has a cathode coupled to an anode of the fourth diode at a second node which receives another input of the AC voltage; the first diode has an anode coupled to an anode of the third diode at a third node which provides a low DC voltage level; and the second diode has a cathode coupled to a cathode of the fourth diode at a fourth node which provides a high DC voltage level.

In one embodiment, the foregoing integrated circuit further comprises: a resistor coupled between the integrated device with AC to DC conversion function and the circuit operating under low DC voltage, and a clamp circuit coupled to the circuit operating under low DC voltage. The clamp circuit for example can be a Zener diode.

In one preferable embodiment, the first and second diodes are in a first region and the third and fourth diodes are in a second region, and the integrated device with AC to DC conversion function further includes: two MOS transistors provided between the first and second regions, one MOS transistor having a gate coupled to one of the inputs of the AC voltage and the other MOS transistor having a gate coupled to the other one of the inputs of the AC voltage.

The objectives, technical details, features, and effects of the present invention will be better understood with regard to the detailed description of the embodiments below, with reference to the drawings.

DESCRIPTION OF THE PREFERRED EMBODIMENTS

Figure 2:
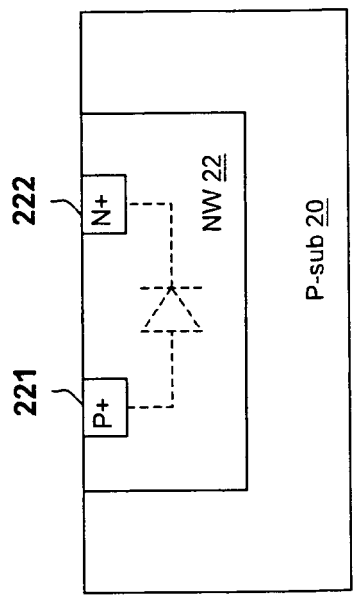
FIG. 2 illustrates a diode according to the present invention, which can be integrated with other circuits.

FIG. 2 shows an example of a diode which can be integrated with other circuits. As shown in the drawing, in the present invention, an N type well region 22 is provided in a P type substrate 20, and a P+ heavily doped region 221 and an N+ heavily doped region 222 are provided in the N type well region 22, which form an anode and a cathode of the diode respectively. In one aspect, the N type well region 22 forms a PN junction with the P+ doped region 221; in another aspect, the N type well region 22 prevents the anode 222 from being shorted with the P type substrate 20 or any improper node (e.g., an anode of another diode). The foregoing semiconductor diode structure can be modified in various ways; for example, more than one P+ or N+ heavily doped region 221 or 222 can be provided for better layout arrangement or for adjusting certain circuit parameters (e.g., the resistance in conduction).

Figure 3:
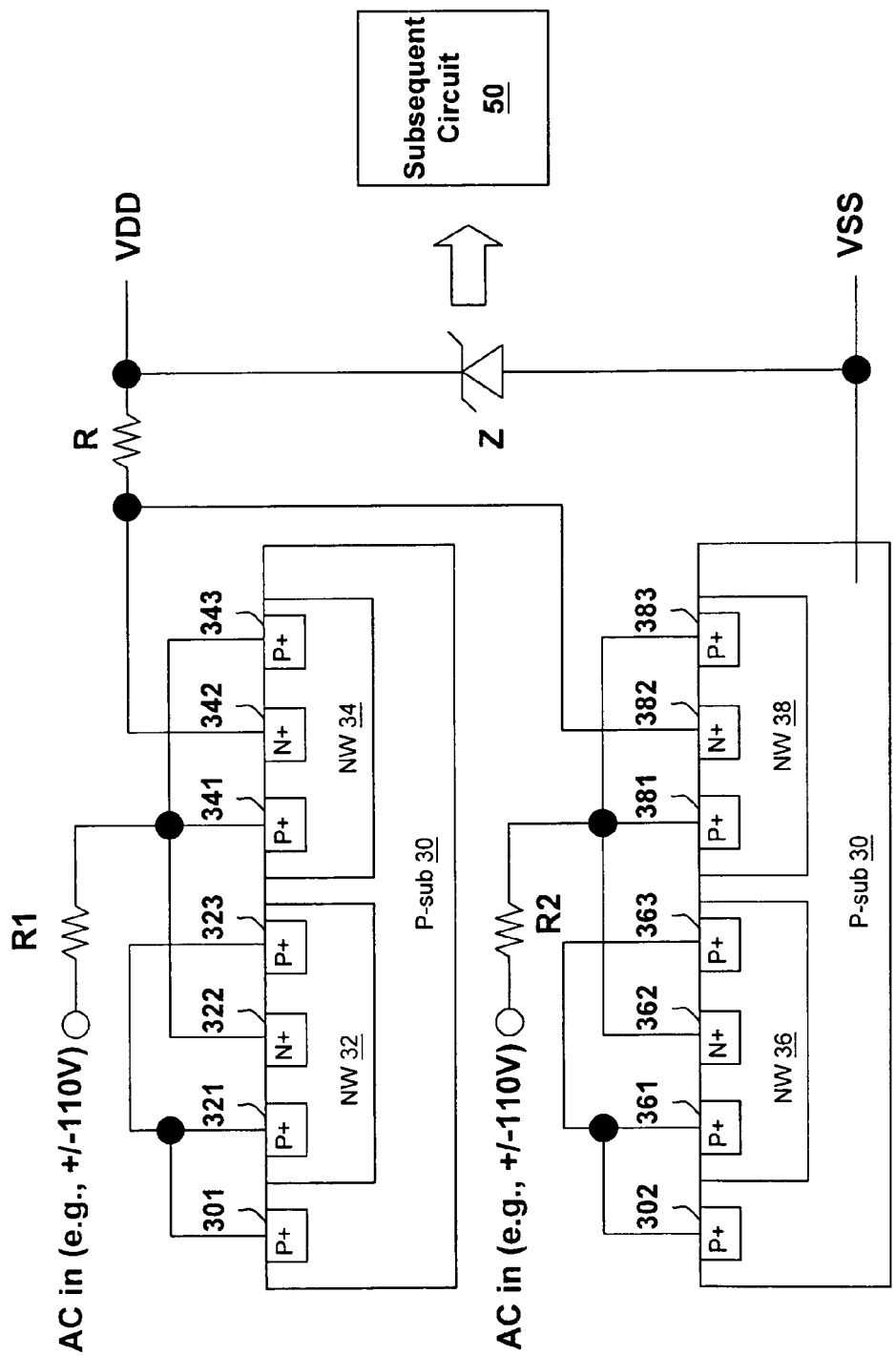
FIGS. 3 and 4 show two embodiments of the present invention, respectively.

FIG. 3 shows one embodiment of the present invention. As shown in the drawing, in this embodiment, an AC voltage (for example but not limited to the domestic electricity supply voltage 110V) is received, which is reduced by external resistors R1 and R2 to an extent acceptable by a device inside an integrated circuit chip. Next, the AC voltage is rectified by an integrated device with AC to DC conversion function to become a DC voltage, the integrated device being integrated as part of the integrated circuit. A resistor R further reduces the rectified DC voltage to generate a high DC operational level VDD and a low DC operational level VSS for a circuit operating under low DC voltage (the subsequent circuit 50). A clamp circuit formed by a Zener diode Z clamps the voltage difference between the DC operational levels VDD and VSS. The clamp circuit can be any other circuit instead of a Zener diode; Zener diode is only one example. An important feature of the present invention is that the integrated device with AC to DC conversion function and the circuit 50 operating under low DC voltage can be integrated into an integrated circuit (the resistor R and the Zener diode Z can also be integrated into the integrated circuit if desired).

In this embodiment, the integrated device with AC to DC conversion function includes a P type substrate 30 wherein N type well regions 32, 34, 36, 38 are provided. P+ heavily doped regions 321 and 323 and an N+ heavily doped region 322 are provided in the N type well region 32, corresponding to the diode 12 in FIG. 1; P+ heavily doped regions 341 and 343 and an N+ heavily doped region 342 are provided in the N type well region 34, corresponding to the diode 14 in FIG. 1; P+ heavily doped regions 361 and 363 and an N+ heavily doped region 362 are provided in the N type well region 36, corresponding to the diode 16 in FIG. 1; P+ heavily doped regions 381 and 383 and an N+ heavily doped region 382 are provided in the N type well region 38, corresponding to the diode 18 in FIG. 1. In this embodiment, each of the diodes has two P+ heavily doped regions (as anodes) and one N+ heavily doped region (as a cathode). In the substrate 30, P+ heavily doped regions 301 and 302 are further provided, forming contacts corresponding to the node A in FIG. 1; and the node at the left side of the resistor R, which is connected with the N+ heavily doped regions 342 and 382, corresponds to the node B in FIG. 1.

Figure 1:
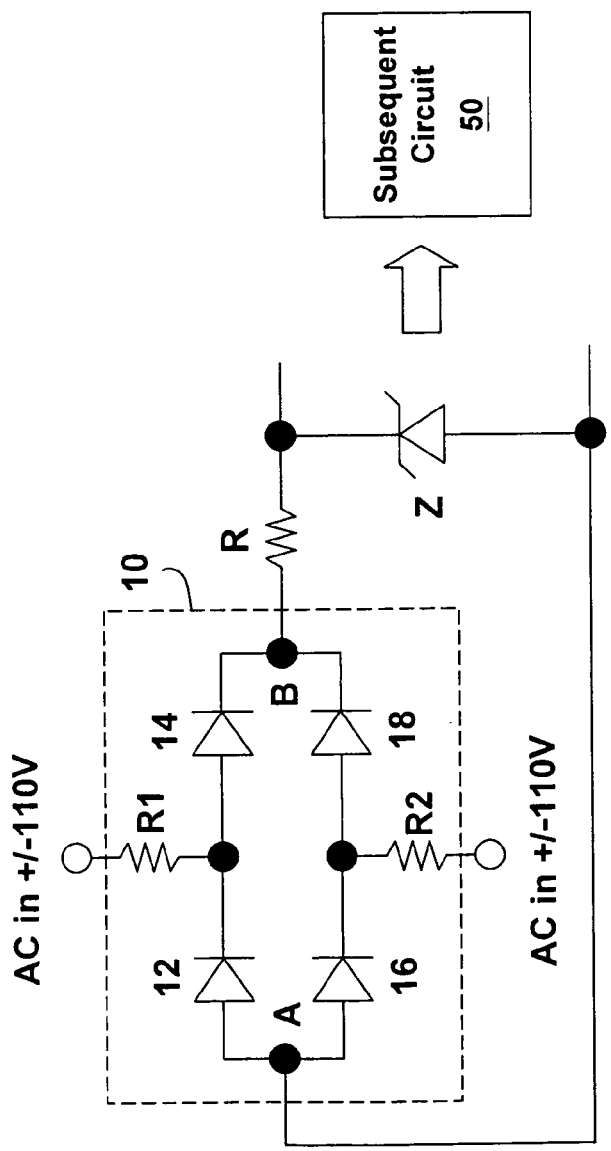
FIG. 1 shows a prior art circuit structure.

The region of the substrate 30 in the upper part of FIG. 3 and the ion implantations therein form the two diodes 12 and 14 shown in the upper side of the bridge rectifier 10 in FIG. 1. The region of the substrate 30 in the lower part of FIG. 3 and the implantations therein form the two diodes 16 and 18 in the lower side of the bridge rectifier 10 in FIG. 1. Preferably, the connection between the two substrate regions should be carefully arranged so as not to form a parasitic NPN BJT (Bipolar Junction Transistor) among the N type well region, P type substrate, and N type well region. If the parasitic NPN BJT is formed, the maximum DC voltage or current will be limited due to the conduction of the parasitic BJT.

Figure 4:
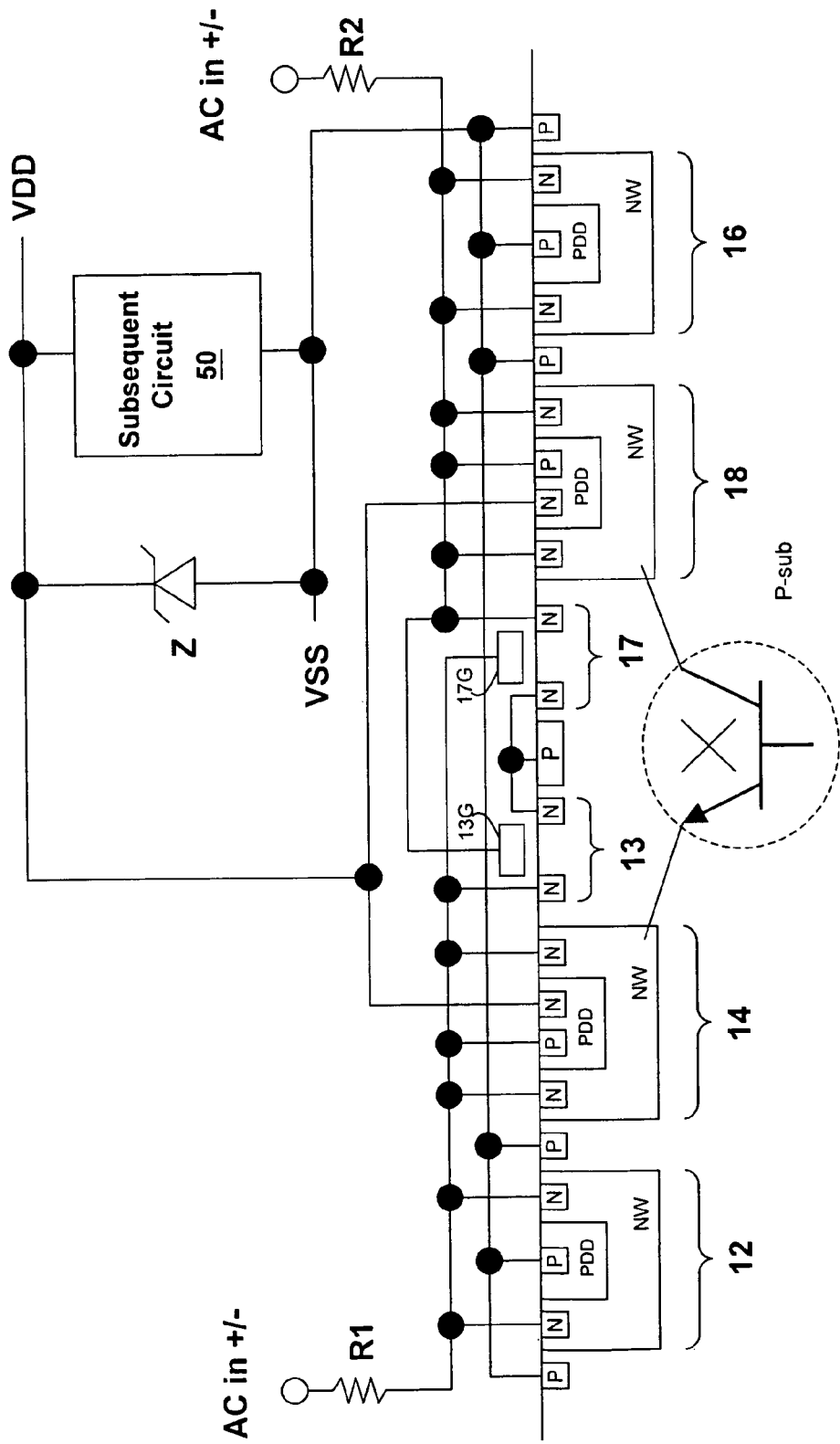

To this end, FIG. 4 shows another embodiment of the present invention to solve the foregoing issue. As shown in the drawing, in the substrate 30 according to the present invention, one or more MOS transistors can be provided between the substrate region corresponding to the upper part of the bridge rectifier 10 (diodes 12 and 14) and the substrate region corresponding to the lower part of the bridge rectifier 10 (diodes 16 and 18), to solve the foregoing issue of the parasitic BJT. In this embodiment two NMOS transistors 13 and 17 are provided, whose gates are coupled to the resistors R1 and R2 respectively, to receive the reduced AC voltage. Thus, the two transistors are turned on in turn, such that the ground potential of the body of the substrate is much closer to zero. For example, when the AC voltage input at the left side is at high level, the MOS transistor 17 is turned on, such that the body of the substrate is connected to the other AC voltage input at the right side via the resistor R2; thus, the ground potential of the substrate body is closer to zero. As such, the parasitic BJT effect can be eliminated, and the DC voltage supply (VDD and VSS) generated by the rectifier can be more stable thereby.

As mentioned earlier, the semiconductor structure of the diode can be embodied in various ways. In this embodiment, a P type lightly doped region (PDD) is further provided in the N type well region in the diode, and the anode is provided in the PDD. In the diodes 12 and 16, two N type heavily doped regions are provided in the N type well region as cathodes. In each of the diodes 14 and 18, an N type heavily doped region is further provided in the PDD as a cathode, and the N type well region is connected with the resistors R1 and R2, i.e., the reduced AC voltage.

Compared with the prior art, the present invention is more advantageous because it can integrate majority of the devices of a rectifier with a circuit operating under low voltage into an integrated circuit; what are left not to have been integrated are only external resistors.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, in each of the embodiments, the integrated device with AC to DC conversion function is for use as a rectifier, which is just an example. The present invention can also be applied to other types of circuits which require AC to DC conversion by diode (s). In view of the foregoing, the spirit of the present invention should cover all such and other modifications and variations, which should be interpreted to fall within the scope of the following claims and their equivalents.

What is claimed is:

1. An integrated device with AC to DC conversion function, comprising:
    a substrate of a first conductivity type; and
    at least four well regions of a second conductivity type in the substrate, each well region of the second conductivity type including:
        a heavily doped region of the first conductivity type in the well region of the second conductivity type; and
        a heavily doped region of the second conductivity type in the well region of the second conductivity type;
    wherein, in each well region of the second conductivity type, a diode is formed by the heavily doped regions of the first and second conductivity type and the well region, such that four diodes are formed by four well regions, wherein the first diode has a cathode coupled to an anode of the second diode at a first node which receives an input of an AC voltage; the third diode has a cathode coupled to an anode of the fourth diode at a second node which receives another input of the AC voltage; the first diode has an anode coupled to an anode of the third diode at a third node which provides a low DC voltage level; and the second diode has a cathode coupled to a cathode of the fourth diode at a fourth node which provides a high DC voltage level; and wherein the integrated device with an AC to DC conversion function is integrated with a circuit operating under low DC voltage to become an integrated circuit.

2. The integrated device of claim 1, further comprising a resistor coupled to fourth node of the high DC voltage level, for lowering the high DC voltage level.

3. The integrated device of claim 2, further comprising a clamp circuit for limiting a voltage difference between the lowered high DC voltage level and low DC voltage level.

4. The integrated device of claim 1, wherein the first and second diodes are located in a first region of the substrate, and the third and fourth diodes are located in a second region of the substrate, the integrated device further comprising: at least one MOS transistor between the first and second regions, the at least one MOS transistor having a gate receiving one of the inputs of the AC voltage.

5. The integrated device of claim 4, wherein two MOS transistors are provided between the first and second regions, one MOS transistor having a gate coupled to one of the inputs of the AC voltage and the other MOS transistor having a gate coupled to the other one of the inputs of the AC voltage.

6. The integrated device of claim 1, wherein each of the diodes further includes: a lightly doped region of the first conductivity type in the well region of the second conductivity type, and wherein the heavily doped region of the first conductivity type is formed in this lightly doped region of the first conductivity type.

7. The integrated device of claim 6, wherein in each of the second and fourth diodes, the heavily doped region of the second conductivity type is formed in the lightly doped region of the first conductivity type.

8. The integrated device of claim 1, wherein the first conductivity type is P type and the second conductivity type is N type.

9. An integrated circuit, comprising:
a circuit operating under low DC voltage; and
an integrated device with AC to DC conversion function, the device including first, second, third and fourth diodes, wherein the first diode has a cathode coupled to an anode of the second diode at a first node which receives an input of an AC voltage; the third diode has a cathode coupled to an anode of the fourth diode at a second node which receives another input of the AC voltage; the first diode has an anode coupled to an anode of the third diode at a third node which provides a low DC voltage level; and the second diode has a cathode coupled to a cathode of the fourth diode at a fourth node which provides a high DC voltage level.

10. The integrated circuit of claim 9, wherein the first node is coupled to the AC voltage input via a resistor and the second node is coupled to the other AC voltage input via another resistor.

11. The integrated circuit of claim 9, further comprising: a resistor coupled between the integrated device with AC to DC conversion function and the circuit operating under low DC voltage.

12. The integrated circuit of claim 9, further comprising: a clamp circuit coupled to the circuit operating under low DC voltage.

13. The integrated circuit of claim 9, wherein in the integrated device with AC to DC conversion function, the first and second diodes are in a first region and the third and fourth diodes are in a second region, and the integrated device with AC to DC conversion function further includes: at least one MOS transistor between the first and second regions, the at least one MOS transistor having a gate which receives one of the inputs of the AC voltage.

14. The integrated circuit of claim 13, wherein two MOS transistors are provided between the first and second regions, one MOS transistor having a gate coupled to one of the inputs of the AC voltage and the other MOS transistor having a gate coupled to the other one of the inputs of the AC voltage.

* * * * *